United States Patent
Ichijo et al.

(10) Patent No.: US 10,849,350 B2
(45) Date of Patent: Dec. 1, 2020

(54) PEELING BLADE

(71) Applicant: ASTRA Co., LTD., Fukushima (JP)

(72) Inventors: Hirotaka Ichijo, Fukushima (JP);
Masakuni Anada, Fukushima (JP);
Katsuhito Sasahara, Fukushima (JP);
Takahiro Karino, Fukushima (JP)

(73) Assignee: ASTRA Co., LTD., Fukushima (JP)

( * ) Notice: Subject to any disclaimer, the term of this patent is extended or adjusted under 35 U.S.C. 154(b) by 234 days.

(21) Appl. No.: 16/151,168

(22) Filed: Oct. 3, 2018

(65) Prior Publication Data

US 2019/0116860 A1    Apr. 25, 2019

(30) Foreign Application Priority Data

Oct. 24, 2017    (JP) .................. 2017-205259

(51) Int. Cl.
*A23N 7/00* (2006.01)
*A23N 7/02* (2006.01)

(52) U.S. Cl.
CPC .................... *A23N 7/026* (2013.01)

(58) Field of Classification Search
CPC ................. A23N 7/026; A47J 17/02
USPC .......... 99/584, 585, 588, 589, 593, 594, 596
See application file for complete search history.

(56) References Cited

U.S. PATENT DOCUMENTS

| | | | | |
|---|---|---|---|---|
| 6,082,253 A * | 7/2000 | Ridler | ...................... | A47J 17/10 99/594 |
| 6,619,194 B1 * | 9/2003 | Kuan | ...................... | A47J 17/02 99/584 |
| 7,185,436 B2 * | 3/2007 | Murphy | ................... | A47J 17/02 30/123.6 |
| 2004/0117991 A1 * | 6/2004 | Haberstroh | ............. | A47J 17/02 30/279.6 |
| 2006/0272161 A1 * | 12/2006 | Di Bitonto | .............. | A47J 17/02 30/279.6 |
| 2007/0186423 A1 * | 8/2007 | Chapman | ................. | A47J 17/02 30/279.6 |
| 2010/0000423 A1 * | 1/2010 | Yu | ........................... | A47J 17/02 99/584 |
| 2010/0269352 A1 * | 10/2010 | Curtin | ................... | B26B 21/521 99/588 |
| 2010/0269715 A1 * | 10/2010 | Curtin | ..................... | A47J 17/02 99/588 |
| 2014/0075759 A1 * | 3/2014 | Sampaio | ................. | A47J 17/02 30/123.6 |

(Continued)

FOREIGN PATENT DOCUMENTS

JP    2016096744 A    5/2016

*Primary Examiner* — Hung D Nguyen
(74) *Attorney, Agent, or Firm* — Law Office of Katsuhiro Arai

(57) ABSTRACT

In an exemplary embodiment, a blade portion 41 is formed by a plurality of blades 42 being arrayed on a front surface of a main body at an even interval while forming blade striation portions 43 between adjacent blades 42. Each blade 42 is cut into a circular-arc shape. A pitch between the blades 42 is in a range of 1 to 3 mm. A recess-portion apex composed of a cut surface of each blade 42 has a rounded shape with a radius of 1.0 to 3.0 mm. A protrusion-portion apex of the blade striation portion 43 has a rounded shape with a radius of 0.1 to 0.5 mm. A tip of the blade 42 formed by the blade striation portion 43 has a rounded shape with a radius of 0.1 to 0.5 mm.

4 Claims, 4 Drawing Sheets

(56) References Cited

U.S. PATENT DOCUMENTS

2014/0230253 A1\* 8/2014 Ancsel ................. A47J 17/02
 30/123.5
2015/0075012 A1\* 3/2015 Opinel ................ B26B 21/527
 30/295

\* cited by examiner

PEELING BLADE

TECHNICAL FIELD

A present invention relates to a peeling blade. In particular, the present invention relates to a peeling blade that is suitable for mounting in a peeling device that performs peeling of a large quantity of fruit and vegetables of many types.

BACKGROUND ART

Since the past, in a process for peeling skin during processing treatment of fruit and vegetables, peeling devices of various configurations have been used to enable the processing treatment to be quickly and easily performed. As a device for efficiently peeling the skin off of fruit and vegetables, the applicants have developed a device that is configured such that a fruit or vegetable is held by being pierced by a fixing pin that configures a holding portion, a rotation shaft that is provided in the holding portion is rotatably driven by a motor, and the skin is peeled by a peeler-shaped peeling blade being pressed against a skin portion to be removed while being moved in a rotation-shaft direction (refer to Patent Literature 1).

Patent Literature 1: Japanese Patent Laid-open Publication No. 2016-096744

SUMMARY OF THE INVENTION

Problem to be Solved by the Invention

It is not difficult to image that, in such a fruit and vegetable peeling device, the quality of the peeling blade that is mounted and the suitability of the fruit or vegetable to be peeled significantly affect the process of peeling work and finished results, such as by causing unpeeled skin to remain or the blade to slip without catching onto the skin of the fruit or vegetable. In addition, in the fruit and vegetable peeling device, situations in which the peeling blade chips during work are required to be completely prevented.

The present invention has been achieved in light of such issues. An object of the present invention is to provide a peeling blade that initially wedges into fruit and vegetables of various sizes and shapes in a favorable manner, has low frictional resistance to flesh of the fruit or vegetable and the like after wedging, is capable of reliably performing peeling, even in cases in which the peeling blade is moved in an oblique direction in relation to an extending direction of a blade portion (oblique peeling), and has a structure that does not easily chip.

Means for Solving Problem

To solve the above-described issues, a peeling blade of the present invention includes a main body that is composed of a plate-shaped member that has a substantially rectangular shape from a front view and a rear view, and has a blade portion in which blades that are placed in contact with a surface of a fruit or vegetable to be peeled are formed. The peeling blade is characterized in that: blade-side engaging portions that are engaged with engaging portions of a peeling-blade supporting member are formed on both ends of the main body in an extending direction of the blade portion; a blade-portion area and a guide-portion area are formed in a substantially center in-plane portion of the main body with an opening portion that extends in a length direction therebetween; the main body is formed such as to be bent in a width direction towards a front-surface side such the blade-portion area and the guide-portion area are brought near each other; an opening-portion end of the blade-portion area is the blade portion; in the blade portion, a plurality of blades are arrayed at an even interval while forming blade striation portions between adjacent blades, each blade being formed on a front surface of the main body such that a blade end portion is cut into a circular-arc shape that arcs from the opening portion into the blade-portion area; a pitch between the blades is equal to or greater than 1 mm and less than 3 mm; a recess-portion apex composed of a cut surface of each blade has a rounded shape with a radius that is equal to or greater than 1.0 mm and equal to or less than 3.0 mm; a protrusion-portion apex of the blade striation portion has a rounded shape with a radius that is equal to or greater than 0.1 mm and equal to or less than 0.5 mm; and a tip of the blade formed by the blade striation portion has a rounded shape with a radius that is equal to or greater than 0.1 mm and equal to or less than 0.5 mm.

An ideal value of the pitch between the blades is 1.8 mm. An ideal value of the radius of the rounded shape of the recess-portion apex composed of the cut surface of each blade is 1.9 mm. An ideal value of the radius of the rounded shape of the protrusion-portion apex of the blade striation portion is 0.2 mm. An ideal value of the radius of the rounded shape of the tip of the blade formed by the blade striation portion is 0.2 mm.

In addition, the peeling blade of the present invention is characterized in that an angle of the bend in the main body is 30 degrees.

Furthermore, the peeling-blade supporting member is characterized by being a peeling-blade supporting portion of a peeler in a peeling device that includes: a fruit and vegetable rotating means for rotatably driving a rotation shaft that is provided in a holding portion that holds a fruit or vegetable to be peeled, and a peeler driving means for placing the peeler in contact with a skin portion of the fruit or vegetable to be removed while moving the peeler in the rotation-shaft direction.

Effects of the Invention

The present invention configured as described above initially wedges into fruit and vegetables of various types, sizes and shapes in a favorable manner, does not slip, is capable of reliably performing peeling, even in cases of oblique peeling in which the peeling blade is moved in an oblique direction in relation to an extending direction of a blade portion, is not prone to blade chipping, has improved durability, and achieves reduced frequency of work to replace the peeling blade and the like.

Furthermore, an effect in which finished results of peeling are extremely favorable can be achieved through use of the peeling blade that is suitable for the fruit or vegetable to be peeled.

Figure 1:
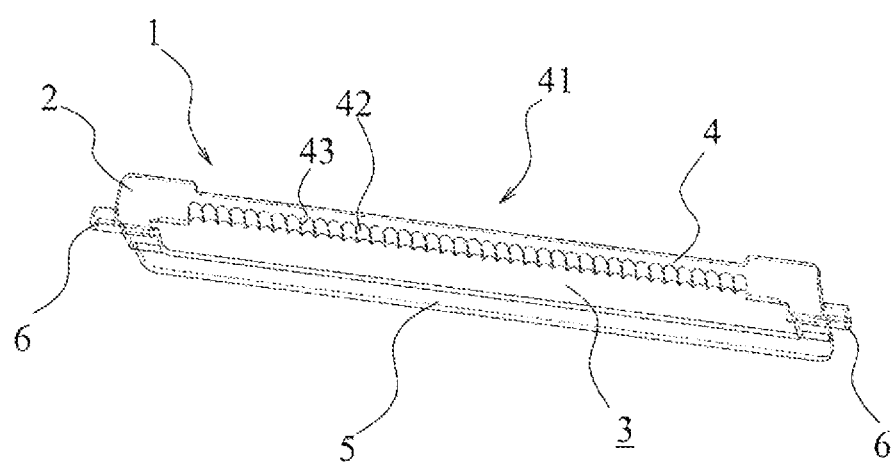
FIG. 1 is an overall perspective view of a structure of a peeling blade according to an embodiment of the present invention.

EXPLANATIONS OF LETTERS OR NUMERALS 1 peeling blade
2 main body
3 opening portion
4 blade-portion area
41 blade portion
42 blade
43 blade striation portion
5 guide-portion area
6 blade-side engaging portion
10 peeling-blade supporting member
10' peeling-blade supporting portion
21 peeling device
22 work holder
23 work supporting portion
24 work rotation motor
25 peeler arm
26 peeler
27 peeler-shaft rotation motor
28 peeler shaft
29 urging member
30 shaft rotation motor
31 center shaft
32 peeler driving section

DETAILED DESCRIPTION OF EMBODIMENTS

A peeling blade 1 according to an embodiment of the present invention will be described with reference to FIG. 1 to FIG. 3.

The peeling blade 1 of the present invention includes a main body 2 that is composed of a plate-shaped member that has a substantially rectangular shape (about 90 mm in a length direction and about 20 mm in a width direction) from a front view and a rear view. The main body 2 has a blade portion 41 in which blades that are placed in contact with a surface of a fruit or vegetable to be peeled are formed.

An opening portion 3 is formed in a substantially center in-plane portion of the main body 2. The opening portion 3 extends in a length direction and functions as a clearance hole that is provided to eliminate effects of plastic deformation caused by bending, described hereafter. A blade-portion area 4 and a guide-portion area 5 are formed above and below in FIG. 1, with the opening portion 3 therebetween. The main body 2 is formed such as to be bent in a width direction by about 30 degrees using the opening portion 3, such that respective rear-surface sides of the blade-portion area 4 and the guide-portion area 5 are brought near each other.

An opening-portion end of the blade-portion area 4 is the blade portion 41. In the blade portion 41, a plurality of blades 42 are arrayed at an even interval while forming blade striation portions 43 between adjacent blades 42. A blade end portion of each blade 42 is cut into a circular-arc shape that arcs from the opening portion 3 into the blade-portion area 4. Each blade 42 is formed on the front surface of the main body 2 such as to slope from a rear-surface side towards a front-surface side and remove thickness of the plate-shaped member of the main body 2. The blades 42 and the blade striation portions 43 are formed such as to be orthogonal to an extending direction of the blade portion 41.

In the peeling blade 1 of the present invention, a pitch between the blades 42 is equal to or greater than 1 mm and less than 3 mm (preferably 1.8 mm). A recess-portion apex composed of a cut surface of each blade 42 has a rounded shape with a radius that is equal to or greater than 1.0 mm and equal to or less than 3.00 mm (preferably a rounded shape with a radius of 1.9 mm). A protrusion-portion apex of the blade striation portion 43 has a rounded shape with a radius that is equal to or greater than 0.1 mm and equal to or less than 0.5 mm (preferably a rounded shape with a radius of 0.2 mm). A tip of the blade 42 that is formed by the blade striation portion 43 has a rounded shape with a radius that is equal to or greater than 0.1 mm and equal to or less than 0.5 mm (preferably a rounded shape with a radius of 0.2 mm) or an elliptical shape from a front view. The shape of the blade portion 41 when viewed from the opening-portion side, that is, a cross-sectional shape of the blade portion 41 of the main body 2 is wavy (not a zig-zag shape).

As a result of the blade portion 41 on the front surface of the main body 2 being formed into a wavy shape in which the recess-portion apexes and the protrusion-portion apexes that are formed into the rounded shapes are connected and joined, as described above, the peeling blade 1 has reduced contact resistance to the fruit or vegetable and can perform favorable peeling, not only for peeling in which the peeling blade 1 is moved in a direction orthogonal to the extending direction of the blade portion 41 (straight peeling) but also for oblique peeling in which the peeling blade 1 is moved in a direction oblique to the extending direction of the blade portion 41.

The pitch between the blades 42 is formed within the above-described numeric range for the following reasons. That is, when the pitch between the blades 42 is less than 1 mm, the pitch becomes too fine. As a result, there is no difference from when a conventional peeler that has a flat blade 42 or the like is used. When the pitch is equal to or greater than 3 mm, the number of blades 42 and the number of blade striations 43 that come into contact with the fruit or vegetable decreases. Wedging into the fruit or vegetable becomes shallow. Effects achieved when the blade 42 is the wave-shaped blade 42 such as that of the present invention cannot be easily experienced.

In addition, the rounded shape of the recess-portion apex composed of the cut surface of each blade 42 is formed within the above-described numeric range for the following reasons. That is, when the rounded shape of the recess-portion apex has a radius of less than 1.0 mm, in the case of oblique peeling such as that described above, the recess-portion apex acts as resistance and may obstruct favorable peeling work. When the radius is greater than 3.0 mm, in this case as well, there is effectively no difference from when the flat blade 42 is used. Effects achieved when the blade 42 is the wave-shaped blade 42 such as that of the present invention cannot be easily experienced.

Furthermore, the rounded shape of the protrusion-portion apex of the blade striation portion 43 is formed within the above-described numeric range for reasons identical to those for forming the rounded shape of the recess-portion apex within the above-described numeric range.

Still further, the tip of the blade 42 that is formed by the blade striation portion 43 is formed within the above-described numeric range for the following reasons. That is, when the tip has a radius that is equal to or less than 0.1 mm, the tip becomes too sharp and catches onto the fruit or vegetable with greater resistance than necessary. As a result, blade chipping easily occurs and durability decreases. In addition, when the tip has a radius that is greater than 0.5 mm, depending on the fruit or vegetable, wedging into the skin of the fruit or vegetable becomes poor and sliding may occur.

In addition, in the peeling blade 1 according to the present embodiment, for example, blade-side engaging portions 6 are formed on both ends of the main body 2 in the extending direction of the blade portion 41. Each blade-side engaging portion 6 engages with an engaging portion (not shown) formed in a peeling-blade supporting member 10, such as a grip of a manual peeler, and holds the peeling blade 1 to the peeling-blade supporting member 10 such as to freely swing.

Figure 2:
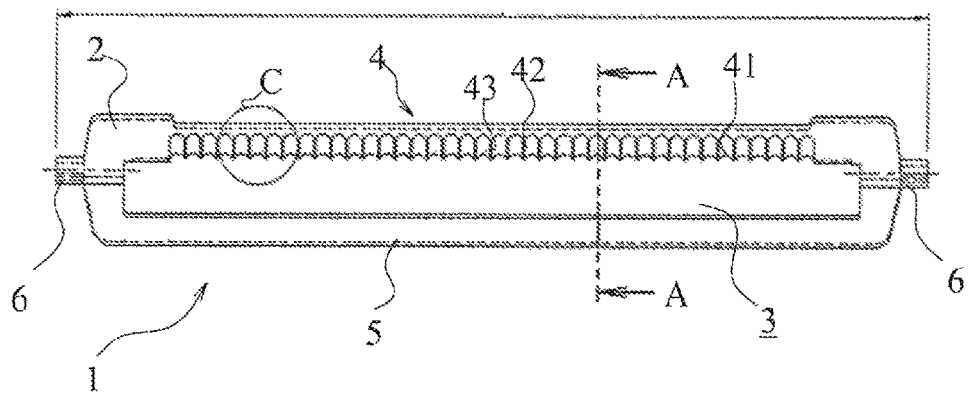
FIG. 2(1) to FIG. 2(6) are diagrams of the peeling blade in FIG. 1, in which FIG. 2(1) is a front view, FIG. 2(2) is a top view, FIG. 2(3) is a bottom view, FIG. 2(4) is a cross-sectional view taken along A-A, FIG. 2(5) is a cross-sectional view taken along B-B, and FIG. 2(6) is an enlarged view of a main section (section C).
Figure 2:
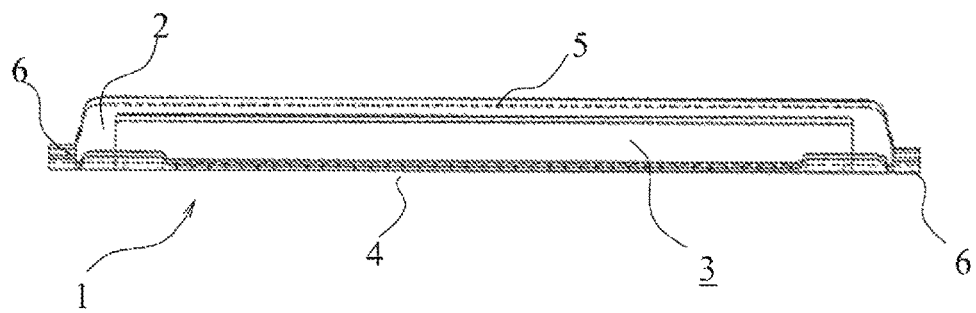
Figure 2:
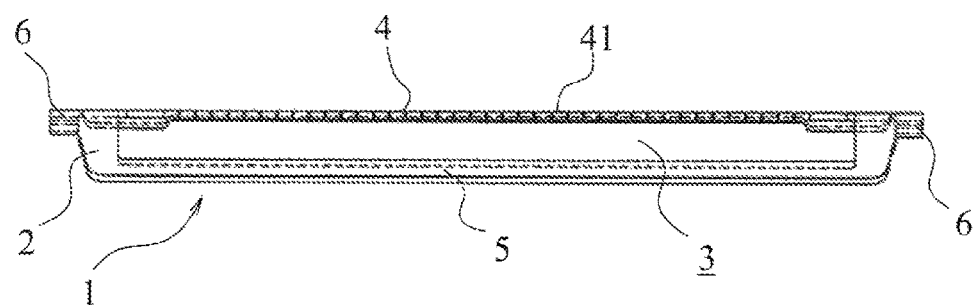
Figure 2:
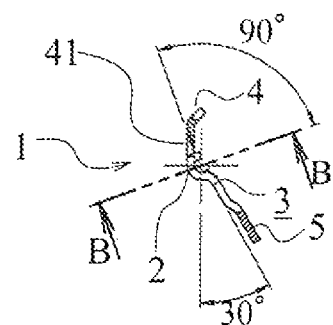
Figure 2:
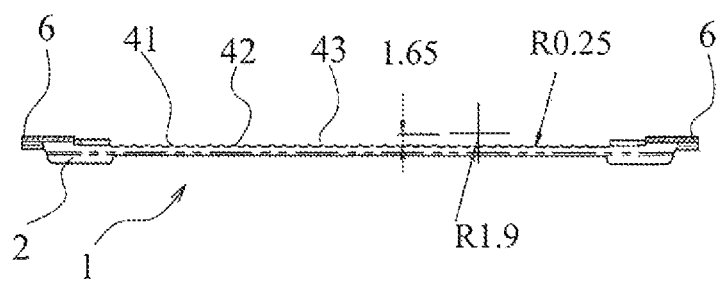
Figure 2:
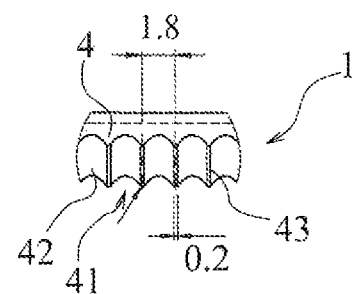

FIG. 1 and FIGS. 2(1) to FIG. 2(6) show the peeling blade 1 according to a first embodiment of the present invention. The pitch between the blades 42 formed in the blade portion 41 is 1.8 mm. The recess-portion apex composed of the cut surface of each blade 42 has a rounded shape with a radius of 1.9 mm. The protrusion-portion apex of the blade striation portion 43 has a rounded shape with a radius of 0.2 mm. The tip of the blade 42 formed by the blade striation portion 43 has a rounded shape with a radius of 0.2 mm.

In addition, the main body 2 is formed such as to be bent in the width direction by about 30 degrees towards the front-surface side using the opening portion 3, such the blade-portion area 4 and the guide-portion area 5 are brought near each other. The main body 2 is formed such that the blade portion 41 formed in the opening-portion end can be appropriately placed in contact with the fruit or vegetable to be peeled by being oriented in an out-of-plane direction.

The peeling blade 1 configured as described above is used such that the guide-portion area 5 is positioned further towards an advancing-direction side of the peeling blade 1 than the blade-portion area 4 and moved with the back surface thereof placed in contact with the skin of the fruit or vegetable to be peeled.

When the peeling blade 1 is moved while being placed in contact with the surface of the fruit or vegetable, as a result of the peeling blade 1 being placed in contact with the surface of the fruit or vegetable such that the guide-portion area 5 leads the blade portion 41, the contact of the blade portion 41 against the fruit or vegetable is stabilized. Peeling of the skin can be performed in a substantially uniform state.

In addition, in the blade portion 41, the tip of the blade striation portion 43 that protrudes to a furthermost tip end on the opening-portion side comes into contact with the skin of the fruit or vegetable such as to pierce the skin, and thereby creates an opening for peeling of the skin. As a result of the peeing blade 1 subsequently advancing, the skin of the fruit or vegetable can be peeled using the blades 42.

For example, in cases in which the fruit or vegetable is a citrus fruit, such as an orange or a grapefruit, a white, spongy section referred to as an albedo (pith) is present on an inner side of a flavedo (zest). When a citrus fruit is peeled, in most cases, peeling is performed such as to include the albedo, such that the resultant fruit is in a state in which the flesh (including carpels that containing the flesh) is exposed. However, because the albedo is a spongy matter that contains a moderate amount of air, the albedo has high frictional resistance to blades and often remains unremoved. However, through use of the peeling blade 1 according to the present embodiment, the albedo can also be reliably removed.

As described above, as a result of the peeling blade 1 according to the present embodiment, initial wedging of the blades 42 into fruit and vegetables of various sizes and shapes is favorable. In addition, frictional resistance to the flesh of the fruit or vegetable and the like after wedging is reduced by the blade portion 41 that is formed into the wavy shape. Peeling can be reliably performed, even in cases of oblique peeling. In addition, the tip of the blade 42 that is formed by the blade striation portion 43 and has a rounded shape with a radius of 0.2 mm is not excessively sharply angled, and is safe, tough, and not easily chipped.

EXAMPLES

As described above, the peeling blade 1 of the present invention is used such that the blade-side engaging portions 6 formed on both ends of the main body 2 in the length direction are engaged with the engaging portions that are formed in the-peeling blade supporting member 10, such as a grip of a manual peeler. However, the peeling-blade supporting member 10 is not limited to T-shaped or I-shaped grips of commercially available peelers. The peeling-blade supporting member 10 may also be a peeling-blade supporting portion 10' of a peeler that is mounted in a peeling device that includes a driving means such as a motor.

As a specific configuration of the peeling device, a peeling device 21 disclosed in the forecited Japanese Patent Laid-open Publication No. 2016-096744 can be given as an example.

Figure 3:
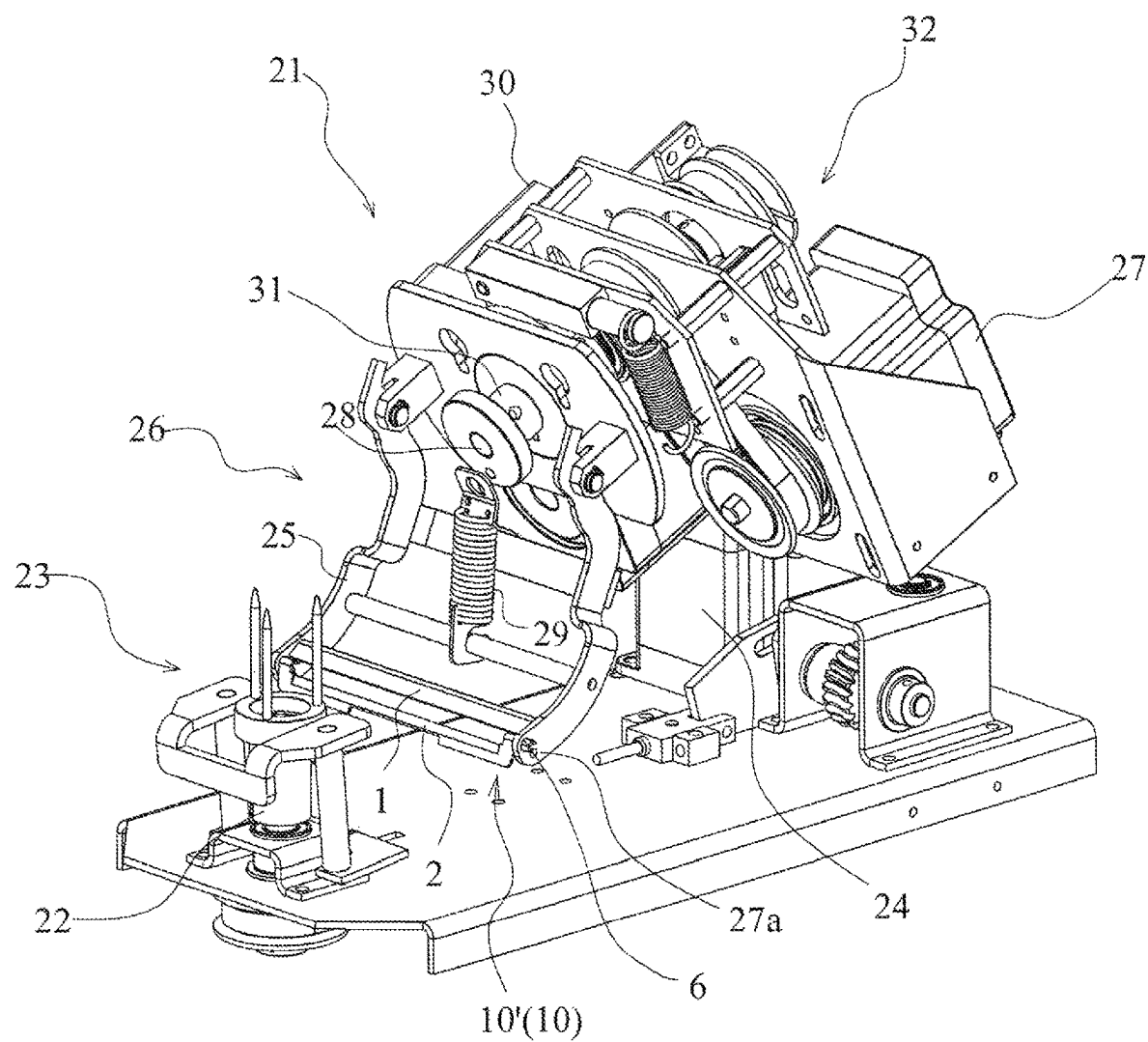
FIG. 3 is an overall perspective view of a configuration of a peeling device that is an example in which the peeling blade of the present invention is used.

As shown in FIG. 3, the peeling device 21 includes a work supporting portion 23 in which a work holder 22 that supports a fruit or vegetable to be peeled in a peelable manner is provided such as to freely rotate by being driven by a work rotation motor 24.

In addition, the peeling device 21 includes a peeler driving section 32 that supports a peeler shaft 28 and a center shaft 31 in a freely rotating manner. The peeler shaft 28 holds a peeler 26 that engages with and supports the peeling blade 1 (peeler blade) at the tips of peeler arms 25. The peeler shaft 28 is rotated by being driven by a peeler rotation motor 27 and moves the peeler 26 along the outer periphery of the fruit or vegetable that is supported by the work holder 22. The center shaft 31 is arranged coaxially with the peeler shaft 28, and an urging member 29 of which one end is connected to the peeler 26 is provided such that the other end is connected to a position away from the peeler shaft in a radial direction. The center shaft 31 is rotated by being driven by a shaft rotation motor 30. The peeler driving section 32 is configured to be capable of adjusting a state of tension of the urging member 29 based on a difference in rotation angle between the peeler shaft 28 and the center shaft 31, and swinging the peeling blade 1 such as to come into and out of contact with a virtual axial line of the peeler shaft 28.

The peeling device 21 peels various fruits and vegetables, such as persimmons, apples, oranges, grapefruit, and turnips. The peeling device 21 places the peeling blade 1 of the peeler 26 in contact with the fruit or vegetable that is held such as to freely rotate by the work supporting portion 23, and performs the above-described oblique peeling by driving the motors 27 and 30, such as the work rotation motor 24.

Therefore, as a result of the peeling blade 1 being appropriately selected based on the thickness of the skin and the like of the fruit or vegetable to be peeled, and the peeling blade 1 being used such that the blade-side engaging portions 6 are engaged with engaging portions 27a that are formed in the peeler arms 27 of the peeler 26, the finished results of peeling can be made extremely favorable. As a result of frictional resistance being reduced, occurrence of blade chipping can be suppressed. Frequency of work to replace the peeling blade 1 and the like can be significantly reduced.

The present application claims priority to Japanese Patent Application No. 2017-205259, filed Oct. 24, 2017, the disclosure of which is incorporated herein by reference in its entirety.

The present invention is not limited to the above-described embodiments. Various modifications are possible to an extent that characteristics of the present invention are not compromised.

We claim:

1. A peeling blade comprising:
a main body that is composed of a plate-shaped member that has a substantially rectangular shape from a front view and a rear view, and has a blade portion in which blades that are placed in contact with a surface of a fruit or vegetable to be peeled are formed, characterized in that
blade-side engaging portions that are engaged with engaging portions of a peeling-blade supporting member are formed on both ends of the main body in an extending direction of the blade portion,
a blade-portion area and a guide-portion area are formed in a substantially center in-plane portion of the main body with an opening portion that extends in a length direction therebetween,
the main body is formed such as to be bent in a width direction towards a front-surface side such that the blade-portion area and the guide-portion area are brought near each other,
an opening-portion end of the blade-portion area is the blade portion,
in the blade portion, a plurality of blades are arrayed at an even interval while forming blade striation portions between adjacent blades, each blade being formed on a front surface of the main body such that a blade end portion is cut into a circular-arc shape that arcs from the opening portion into the blade-portion area,
a pitch between the blades is equal to or greater than 1 millimeter and less than 3 millimeters,
a recess-portion apex composed of a cut surface of each blade has a rounded shape with a radius that is equal to or greater than 1.0 millimeters and equal to or less than 3.0 millimeters,
a protrusion-portion apex of the blade striation portion has a rounded shape with a radius that is equal to or greater than 0.1 millimeters and equal to or less than 0.5 millimeters, and
a tip of the blade formed by the blade striation portion has a rounded shape with a radius that is equal to or greater than 0.1 millimeters and equal to or less than 0.5 millimeters.

2. The peeling blade according to claim 1, wherein:
an angle of the bend in the main body is 30 degrees.

3. The peeling blade according to claim 2, wherein:
the peeling-blade supporting member is a peeling-blade supporting portion of a peeler in a peeling device; and
the peeling device includes
a fruit and vegetable rotating means for rotatably driving a rotation shaft that is provided in a holding portion that holds a fruit or vegetable to be peeled, and
a peeler driving means for placing the peeler in contact with a skin portion of the fruit or vegetable to be removed while moving the peeler in the rotation-shaft direction.

4. The peeling blade according to claim 1, wherein:
the peeling-blade supporting member is a peeling-blade supporting portion of a peeler in a peeling device; and
the peeling device includes
a fruit and vegetable rotating means for rotatably driving a rotation shaft that is provided in a holding portion that holds a fruit or vegetable to be peeled, and
a peeler driving means for placing the peeler in contact with a skin portion of the fruit or vegetable to be removed while moving the peeler in the rotation-shaft direction.

* * * * *